(12) United States Patent
Webster

(10) Patent No.: US 6,708,637 B1
(45) Date of Patent: Mar. 23, 2004

(54) HOLD DOWN DEVICE FOR AN ULTRA HIGH MOLECULAR WEIGHT COMPOSITE MATERIAL

(75) Inventor: Elwood Richard Webster, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/320,776

(22) Filed: Dec. 17, 2002

(51) Int. Cl.[7] .................................................. B63B 3/00
(52) U.S. Cl. ..................... 114/85; 114/65 R; 52/506.05
(58) Field of Search ................................. 114/65 R, 84, 114/85, 355–357, 364; 52/506.01, 506.05, 509, 573.1; 428/77, 98, 131, 188, 409, 411.1; 403/167, 179, 187, 192, 408

(56) References Cited

U.S. PATENT DOCUMENTS

| | | | | |
|---|---|---|---|---|
| 4,394,096 A | * | 7/1983 | Stevens | 403/408.1 |
| 4,528,783 A | * | 7/1985 | Muir | 144/355 |
| 4,596,734 A | * | 6/1986 | Kramer | 428/213 |
| 4,679,517 A | * | 7/1987 | Kramer | 114/45 |
| 5,095,840 A | * | 3/1992 | Kramer | 114/219 |
| 5,346,759 A | * | 9/1994 | Will | 428/329 |
| 5,361,715 A | * | 11/1994 | Kiedaisch et al. | 114/219 |
| 6,224,809 B1 | * | 5/2001 | Orndorff, Jr. | 264/255 |

* cited by examiner

Primary Examiner—S. Joseph Morano
Assistant Examiner—Ajay Vasudeva
(74) Attorney, Agent, or Firm—David S. Kalmbaugh

(57) ABSTRACT

A hold down device for securing an ultra high molecular weight composite material which is used on the deck plate or hull of a ship as a non-skid surface. The hold down device includes a base attached to the deck plate and a hold down plate secured to the base by a threaded screw. The hold down device allows for thermal expansion of the UHMW composite material which prevents the UHMW composite material from separating from the deck plate.

11 Claims, 4 Drawing Sheets

HOLD DOWN DEVICE FOR AN ULTRA HIGH MOLECULAR WEIGHT COMPOSITE MATERIAL

BACKGROUND OF THE INVENTION

1. Field of the Invention

The present invention relates generally to an ultra high molecular weight composite material which is used on the deck plate of a ship as a non-skid surface. More specifically, the present invention relates to a hold device which secures an ultra high molecular weight composite material to the deck plate of a ship and allows for thermal expansion of material without damaging the material.

2. Description of the Prior Art

Presently, Naval watercraft and ocean going vessels are using ultra high molecular weight (UHMW) composite materials fastened to the deck plate of the watercraft as a non-skid surface for the deck plate. The UHMW composite materials provide an extremely durable non skid surface.

The UHMW composite materials are supplied to the Navy in large sheets which are fastened to the deck plate of the watercraft using welded studs, washers and nuts countersunk into the deck plate. Location of holes in the UHMW composite material and the studs in the deck plate is precise since the holes and the studs must be aligned prior to securing the UHMW composite material to the deck plate. Repeated expansion and contraction of the composite material due to temperature variations stresses the studs which often fail before the UHMW composite material reaches five percent of its useful life.

This attachment method requires unnecessary precision to secure the UHMW composite material to the deck plate and does not allow for thermal expansion of the material.

Accordingly, there is a need for a very simple and highly effective device to secure UHMW composite material to the deck plate of watercraft which allows for thermal expansion of the material without separation of the material from the deck plate.

SUMMARY OF THE INVENTION

The present invention overcomes some of the disadvantages of the past including those mentioned above in that it provides for a relatively simple in design, yet highly effective hold down device which is used to secure a UHMW composite material to the deck plate of a watercraft and to vertical structures of the watercraft. The hold device of the present invention also allows for thermal expansion of the composite material without separating the composite material from the deck plate of the watercraft.

The hold down device includes a base, attached to the deck plate, and a hold down plate secured to the base by a threaded screw. The hold down device allows for thermal expansion of the UHMW composite material which prevents the UHMW composite material from separating from the deck plate.

A UHMW hole cutter tool is used to cut an opening in the composite material which allows a user to weld the base of the hold down device to the deck plate of the watercraft. An upper portion of the opening has a greater diameter than the lower portion of the opening in the UHMW composite material formed by the cutter tool on the UHMW composite material. The base of the hold down device fits within the lower portion of the opening and is secured to the deck plate by electric welding.

When the hold down device is fully assembled, the hold down plate is positioned on a ledge formed on the UHMW composite material between the lower and upper portions of the UHMW composite material which secures the material to the deck plate.

DETAILED DESCRIPTION OF A PREFERRED EMBODIMENT

Figure 1:
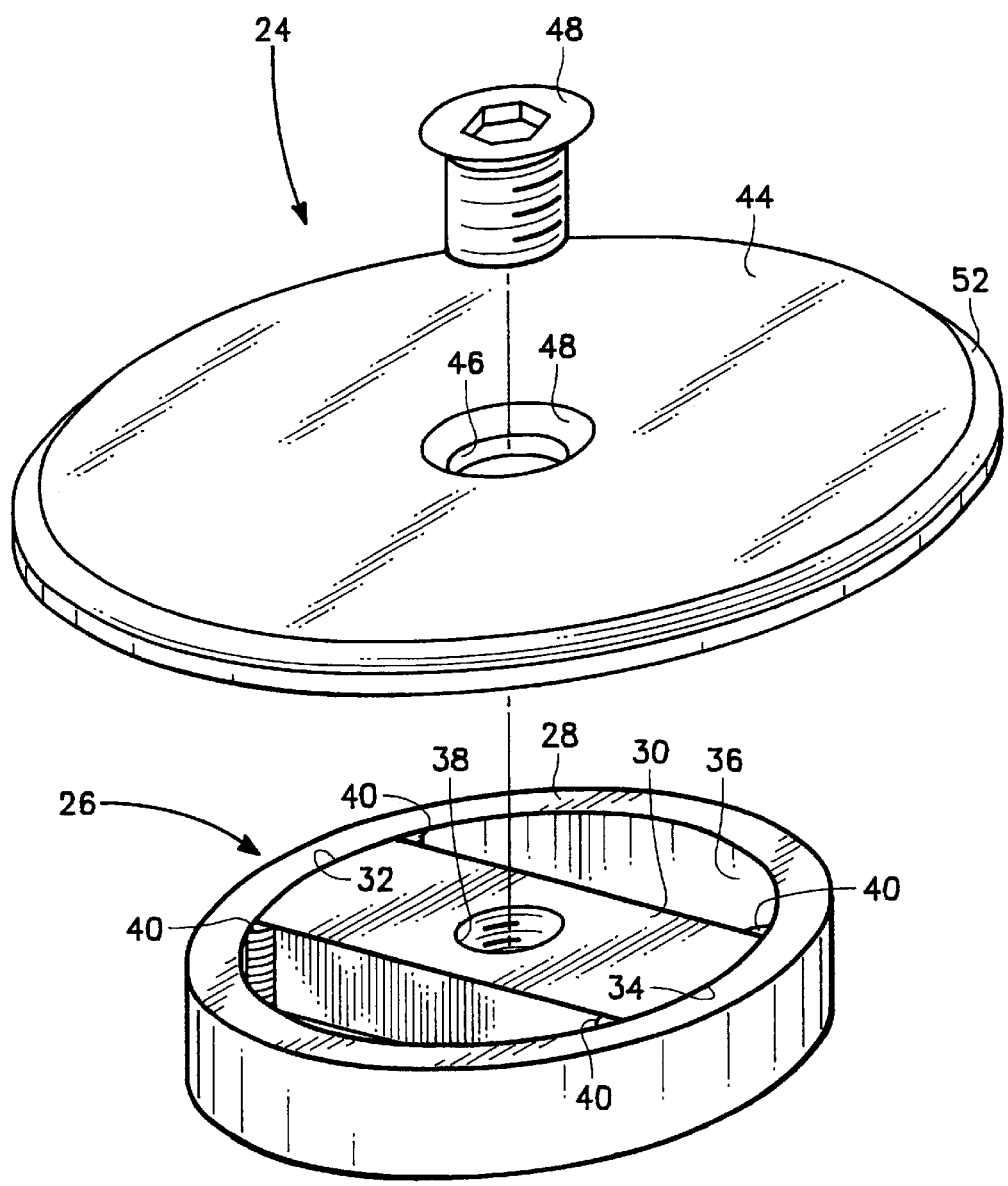
FIG. 1 is a perspective view of a hold down device which is used to secure a UHMW composite material to the deck plating of watercraft.
Figure 2:
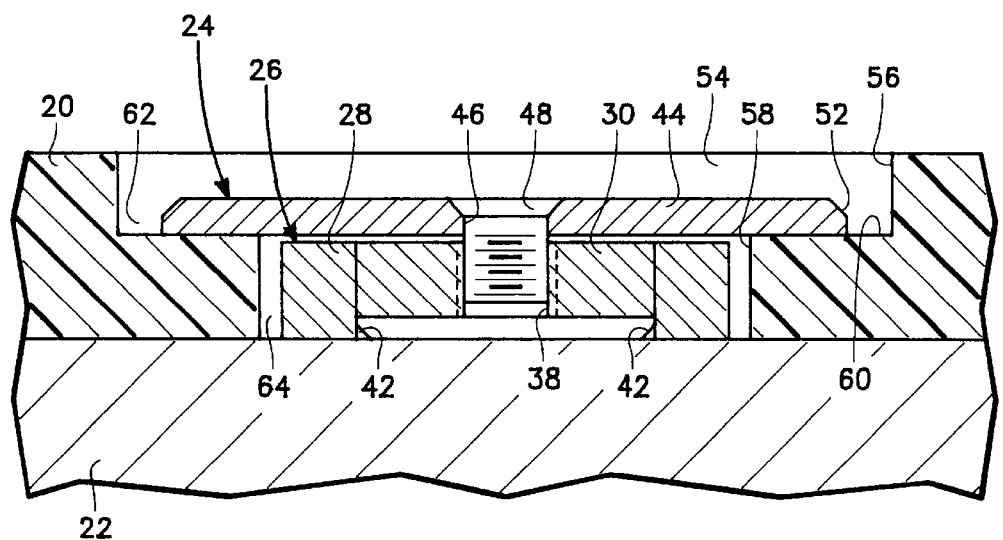
FIG. 2 is a view, in section, depicting the hold down device when fully assembled to secure the UHMW composite material to the deck plating of watercraft.

Referring to FIGS. 1 and 2, there is shown an ultra high molecular weight (UHMW) composite material 20 which is used on the deck plate 22 of a ship as a non-skid surface. The UHMW composite material 20 is attached to the deck plate 22 by a hold down device 24 which comprises a preferred embodiment of the present invention. Hold down device 24 is configured to allow for expansion and contraction of UHMW composite material 20 without separation of composite material 20 from the deck plate 22 of the ship.

Hold down device 24 comprises a base 26 which has a tubular member/tube 28 fabricated from structural grade steel which meets ASTM Specification A572 Grade 50 or A992, and a bar 30 positioned within tube 28 also fabricated from structural grade steel. The tube 28 has an outside diameter of three inches, an inside diameter of 2½ inches and a thickness of ⅝ of an inch. Bar 30 has an overall length 2⁷⁄₁₆ inches, a width of one inch and a thickness of ½ inch. Bar 30 includes a pair of rounded ends 32 and 34 which mate with the inside surface 36 of tube 28. Welds 40 are used to attach bar 30 to the inside surface 36 of tube 28.

Figure 3:
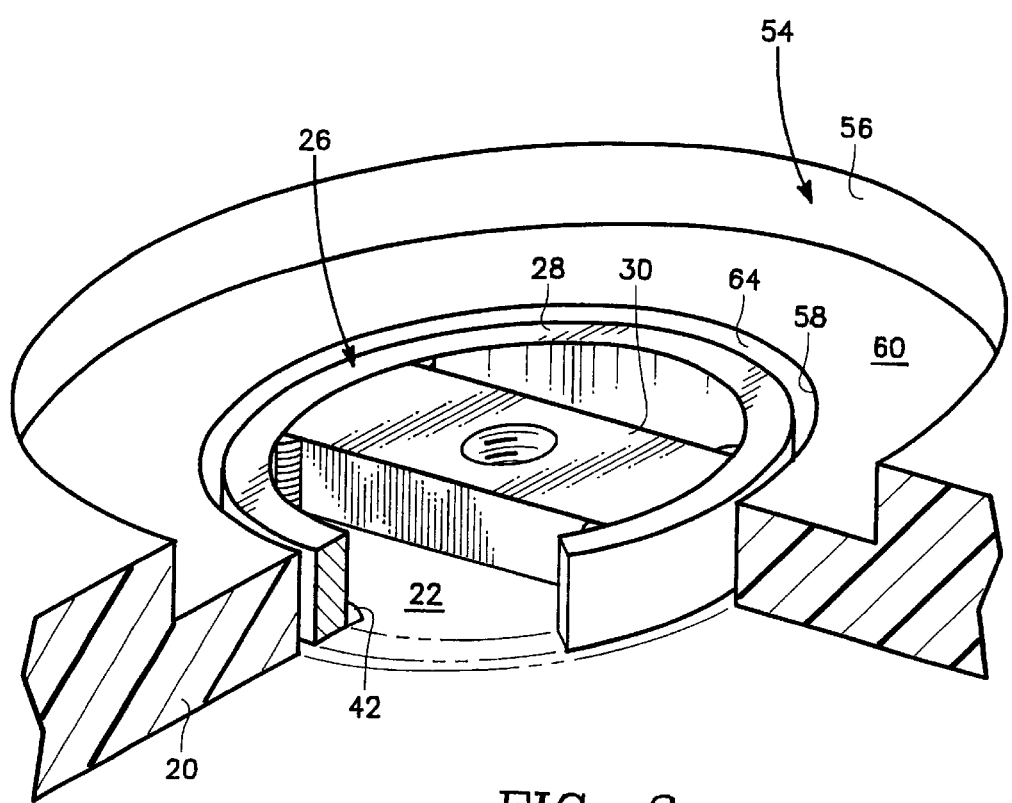
FIG. 3 is cutaway view of the base of the hold down device secured to the deck plate of the watercraft.

Bar 30 also has a centrally located opening 38 which is threaded in the manner depicted in FIGS. 1 and 2. The base 26 of hold down device 24 is attached to the upper surface of deck plate 22 by welds 42. The welds 42 are located on the inside surface of tube 28 of base 26 in the manner shown in FIG. 3.

The opening 38 is threaded via a drill and tap process with a ½"-13 UNC thread size.

Hold down device 24 also includes a hold down plate 44 which has a centrally located tapered opening 46 and a diameter of 4¾ inches. The tapered opening 46 within plate 44 aligns with the threaded opening 38 of base 26 allowing a user of hold down device 24 to utilize a ½"-13 UNC flat head socket screw 48 with a hex opening to use an allen wrench to secure plate 44 to base 26.

The tapered opening 46 within plate 44 is counter sunk to receive the head of the flat head socket screw 48. A ledge 60 is formed on the composite material 20 between the outer diameter 56 of opening 54 and its inner diameter 58. When assembled the hold down plate 44 is positioned on ledge 60 in the manner illustrated in FIG. 2.

Tapered opening 46 is aligned with the threaded opening 38 in base 26. The user then inserts screw 48 through tapered opening 46 into threaded opening 38 and rotates screw 48 in a clockwise direction using alien wrench to secure plate 44 to base 26. To release plate 44 from base 26 the user rotates the alien wrench counterclockwise removing the screw 48 from threaded opening 38.

At this time, it should be noted that there is a ⅛"×45° chamfer 52 positioned at the periphery of the hold down plate 44. The hold down plate 44 is also fabricated from structural steel which meets ASTM Specification A572 Grade 50 or A992.

Figure 4A:
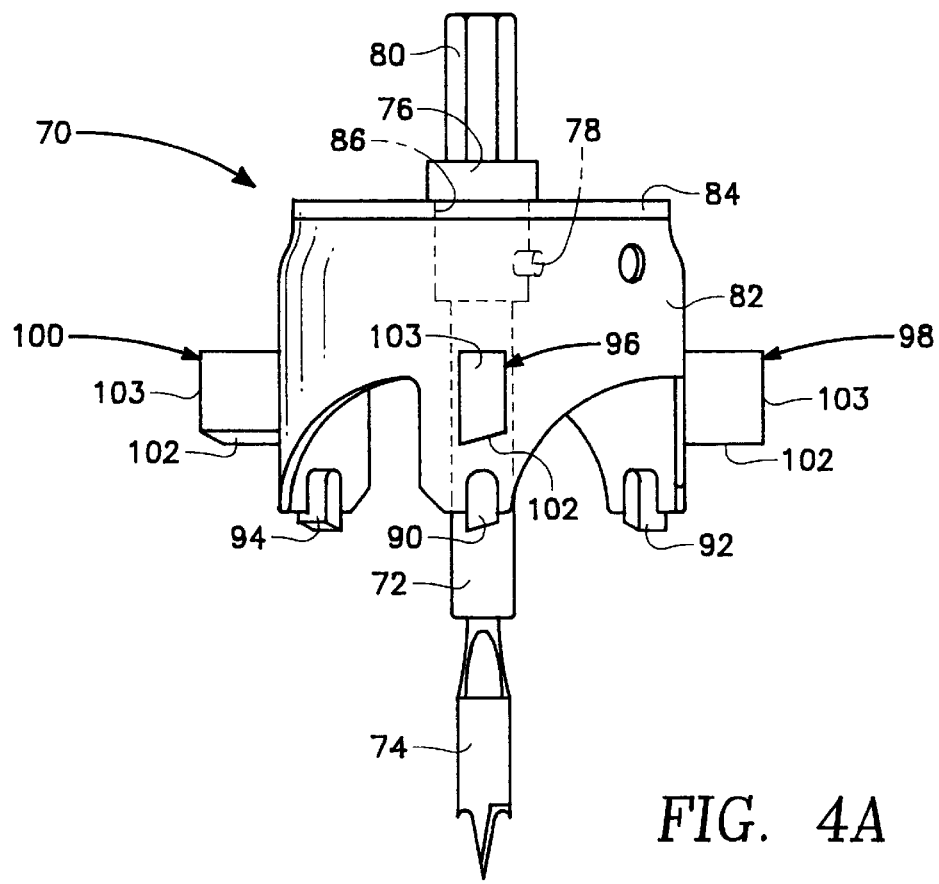
FIGS. 4A and 4B illustrate the UHMW hole cutter which is used to cut a countersunk opening within the UHMW composite material for the hold down device.
Figure 4B:
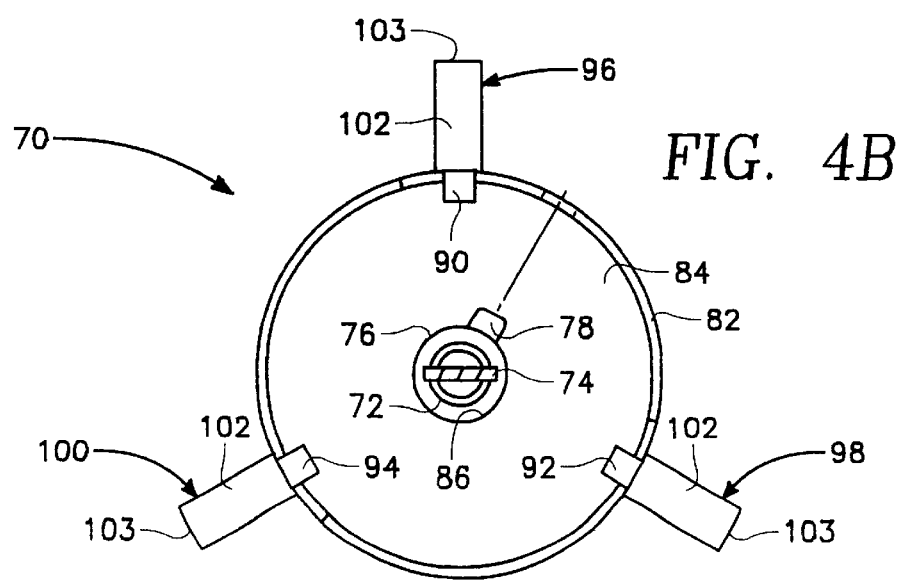

To allow for an expansion or a contraction of the ultra high molecular weight composite material 20 when secured to the deck plate 22 of a ship an opening 54 is cut in the composite material 20 using a hole cutter 70 depicted in FIG. 4A. The opening 54 has an outer diameter 56 of 5⅛ inches to accommodate hold plate 44 and an inner diameter 58 of 3¼ inches to accommodate base 26.

A gap 62 formed between the periphery of hold down plate 44 and the outer diameter 56 of opening 54 is about ¼ of an inch in length. Similarly, a gap 64 formed between the periphery of base 26 and the inner diameter 58 of opening 54 is about ⅛ of an inch. Gaps 62 and 64 allow for expansion and contraction of UHMW composite material 20 about hold down device 24 caused by temperature variations when a ship is at sea. In addition, shear force from the UHMW composite material 20 is distributed over a greater area of the periphery base 26. This, in turn, prevents the UHMW composite material 20 from separating the deck plate 22 and the subsequent damage of the material 20.

It should be noted that the hold down device 24 may be used to hang UHMW material as a facade on a structure.

A uniquely designed UHMW hole cutting tool 70 which is configured for attachment to a pneumatic or electrical drill is used to cut each opening 54 within UHMW composite material 20.

Cutter tool 70 comprises a shaft 72 which has a 9/16 inch drill bit 74 attached to its lower end and its upper end secured to a cylindrical shaped cutter housing support member 76 by a screw 78. Attached to the upper end of cutter housing support member 76 is a hexagonal shaped cutting tool drill attachment member 80 which is used to secure cutter tool 70 to a pneumatic or electrical drill.

Cutter tool 70 also has a cylindrically shaped cutting tool housing 82 and an upper plate 84 which is attached to housing 82 by means of welds. Upper plate 84 includes a centrally located opening 86 which has cutter housing support member 76 positioned therein. Upper plate 84 is attached to support member 76 by means of welds.

Cutter tool 70 has three equally spaced cutting edges 90, 92 and 94 formed at the bottom of cylindrical shaped cutting tool housing 82 and integral thereto. Cutter tool 70 also has three equally spaced apart cutting blocks 96, 98 and 100 attached to its outer surface by means of welds. Each cutting block 96, 98 and 100 has a cutting edge 102 which is angled at approximately 15°. Each cutting block 96, 98 and 100 also has a second cutting edge 103 which is perpendicular to cutting edge 102 for each cutting block 96, 98 and 100.

In a similar manner, the three equally spaced cutting edges 90, 92 and 94 formed at the bottom of cylindrical shaped cutting tool housing 82 are angled at approximately 15°. The cutting edges 102 of the three cutting block 96, 98 and 100 are positioned 11/16 of an inch above the cutting edges 90, 92 and 94 formed at the bottom of cylindrical shaped cutting tool housing 82.

The 9/16 inch drill bit 74 of cutter tool 70 is used to position cutter tool 70 and start the process of cutting the opening 54 within UHMW composite material 20. The drill bit 74 drills a hole in the UHMW composite material 20 aligning the cutter tool 70 with a desired location for placement of hold down device 24.

After drill bit 74 bores a 9/16 through hole, shaft 72 acts as a pilot for the cutting edges 90, 92 and 94. When the inner diameter 58 has been cut sufficiently deep, tool housing 82 acts as a pilot in opening outer diameter 56 for the cutting blocks 96, 98 and 100. Rotating the cutter tool 70 until it cuts the UHMW composite material 20 provides ledge 60 to deck 22 height which is approximately 11/16 of an inch.

The overall thickness of the composite material 20 is about 1¼ inches, while the depth of the outer portion of opening 54 is 9/16 of an inch.

The cutting edges 90, 92 and 94 of cutter tool 70 are used to cut the inner diameter 58 of opening 54, the ledge is cut by the cutting edges 102 of the of the three cutting blocks 96, 98 and 100, and the outer diameter 56 of opening 54 is cut by the cutting edges 103 of the three cutting block 96, 98 and 100.

What is claimed is:

1. A hold down device for securing an ultra high molecular weight (UHMW) composite material which is used on a deck plate for a ship comprising:

(a) a base attached to the deck plate of said ship, said base being positioned in an opening within said UHMW composite material, said base including a tubular member and a bar positioned within said tubular member and attached thereto, the bar of said base having a centrally located threaded opening;

(b) a hold down plate positioned on a ledge formed in an upper portion of the opening in said UHMW composite material, said hold down plate having a tapered opening which is in alignment with the threaded opening in the bar of said base; and (c) a screw inserted through the tapered opening in said hold down plate into the threaded opening of said base and said screw being rotated in a first direction to secure hold down plate to said base.

2. The hold down device of claim 1 wherein said hold down plate and said base are fabricated from structural grade steel.

3. The hold down device of claim 1 wherein a first gap is formed between a lower portion of the opening within said UHMW composite material and the periphery of said base and a second gap is formed between the upper portion of the opening within said UHMW composite material and the periphery of said hold down plate, said first gap and said second gap allowing for thermal expansion and contraction of said UHMW composite material to prevent separation of said UHMW composite material from said deck plate.

4. The hold down device of claim 1 wherein a UHMW hole cutter tool is used to cut the opening in said UHMW composite material which allows a user to weld the base of said hold down device to the deck plate of said ship and secure said hold down plate to said base to prevent said UHMW composite material from separating from the deck plate of said ship.

5. A hold down device for securing an ultra high molecular weight (UHMW) composite material which is used on the deck plate for a ship comprising:

(a) a base attached to the deck plate of said ship, said base being positioned in an opening within said UHMW composite material, said base including a tubular member and a bar positioned within said tubular member and attached thereto, the bar of said base having a centrally located threaded opening, said base having a diameter of approximately three inches;

(b) a hold down plate positioned on a ledge formed in an upper portion of the opening in said UHMW composite material, said hold down plate having an opening which is in alignment with the threaded opening in the bar of said base, said hold down plate having a diameter of approximately of 4¾ inches;

(c) a flat head socket screw inserted through the opening in said hold down plate into the threaded opening of said base; and (d) said flat head socket screw being rotated in a clockwise direction by an allen wrench inserted into a hexagonal opening within said flat head socket screw to secure hold down plate to said base.

6. The hold down device of claim 5 wherein said hold down plate and said base are fabricated from structural grade steel.

7. The hold down device of claim 5 wherein a first gap of approximately ⅛ of inch is formed between a lower portion of the opening within said UHMW composite material and the periphery of said base and a second gap of approximately ¼ of inch is formed between the upper portion of the opening within said UHMW composite material and the periphery of said hold down plate, said first gap and said second gap allowing for thermal expansion and contraction of said UHMW composite material to prevent separation of said UHMW composite material from said deck plate.

8. The hold down device of claim 5 wherein a UHMW hole cutter tool is used to cut the opening in said UHMW composite material which allows a user to weld the base of said hold down device to the deck plate of said ship and secure said hold down plate to said base to prevent said UHMW composite material from separating from the deck plate of said ship.

9. A method for securing an ultra high molecular weight (UHMW) composite material to a deck plate for a ship, said method comprising the steps of:

(a) positioning said UHMW composite material on the deck plate of said ship;

(b) cutting a plurality of openings in said UHMW composite material for placement of a hold down device in each of said plurality of openings, each of said plurality of openings in said UHMW composite material having a lower portion with a diameter of approximately 3¼ inches, and an upper portion with a diameter of approximately 5¼ inches;

(c) placing a base in each of said plurality of openings and attaching said base to said deck plate via a weld;

(d) placing a hold down plate within the upper portion of each of said plurality of openings;

(e) aligning a tapered opening in the hold down plate in each of said plurality of openings with a threaded opening in the base in each said plurality of openings;

(f) inserting a flat head socket screw through the tapered opening in the hold down plate in each of said plurality of openings to engage the threaded opening in the base in each of said plurality of openings; and (h) rotating said flat head socket screw in a clockwise direction to secure the hold down plate in each of said plurality of openings to the base in each of said plurality of openings.

10. The method of claim 8 wherein a first gap of approximately ⅛ of inch is formed between a lower portion of each of said plurality of openings within said UHMW composite material and the periphery of said base and a second gap of approximately ¼ of inch is formed between the upper portion of each of said plurality of openings within said UHMW composite material and the periphery of said hold down plate, said first gap and said second gap in each of said plurality of openings allowing for thermal expansion and contraction of said UHMW composite material to prevent separation of said UHMW composite material from said deck plate.

11. The method of claim 10 wherein a UHMW hole cutter tool is used to cut each of said plurality of openings in said UHMW composite material which allows a user to weld the base in each of said plurality of openings to the deck plate of said ship and secure the hold down plate in each of said plurality of openings to the base in each of said plurality of openings to prevent said UHMW composite material from separating from the deck plate of said ship.

* * * * *